3,350,399
METHOD OF PREPARING PYRAZINOIC ACID
Menasche Litmanowitsch, Schaffhausen, and Hans Suter, Dorflingen, Switzerland, assignors to Eprova Limited, Schaffhausen, Switzerland
No Drawing. Filed Dec. 8, 1966, Ser. No. 600,026
Claims priority, application Switzerland Dec. 24, 1963, 15,950/63
7 Claims. (Cl. 260—250)

ABSTRACT OF THE DISCLOSURE

Pyrazinoic acid is prepared by condensing $\alpha,\beta$-diaminopropionic acid with glyoxal in an alkaline medium containing a lower alkanol or a lower alkoxy-lower-alkanol as a solvent to form dihydropyrazinoic acid which is readily oxidized by air to pyrazinoic acid.

Cross-reference to related application

This application is a continuation-in-part of our co-pending application, Ser. No 417,486, filed Dec. 10, 1964, now abandoned.

Background of the invention

This invention relates to a simple and convenient method of preparing pyrazinoic acid.

Pyrazinoic acid is employed as a starting material in the manufacture of pyrazinamide, a well-known anti-tuberculosis drug. The methods available heretofore for the synthesis of pyrazinoic acid require relatively costly reagents and/or produce the acid in relatively low yields. The object of the invention is the provision of a method which yields pyrazinoic acid at relatively low cost and high yield.

It was generally preferred heretofore to prepare pyrazinoic acid by the method believed first to have been described by Hall et al. (J.A.C.S. 62 (1940) 664) and later by Jones et al. (Org. Synth. 30 (1950) 86–90) in which o-phenylenediamine is condensed with glyoxal to form quinoxaline. Oxydation of the heterocyclic compound with potassium permanganate yields pyrazine-2,3-dicarboxylic acid which may then be partly decarboxylated. Certain improvements have been made in this method by McEven (U.S. Patent No. 2,675,384), Reese et al. (U.S. Patent No. 2,723,974), Gainer et al. (U.S. Patent No. 3,096,330), Beck (U.S. Patent No. 3,154,549), and the inventors of the Japanese published patent applications Sho, 34/7,932 (1959) and Sho, 34/8,125 (1959).

The preparation of one kilogram pyrazinoic acid by the oxidation of side chains on a pyrazine ring requires the use of at least 10 kilograms of potassium permanganate. The oxidant is relatively costly, and the manganese dioxide produced in the reaction makes it difficult to recover the pyrazine-carboxylic acids formed.

Summary of the invention

We have found that pyrazinoic acid may be prepared in a simple manner by condensing $\alpha,\beta$-diaminopropionic acid or its salts in an alkaline medium with glyoxal, whereby dihydropyrazinoic acid is obtained which readily reacts with all mild oxidants, including atmospheric oxygen, to yield pyrazinoic acid.

The yields are very high if the condensation reaction is performed in an alcoholic medium mainly consisting of a lower alkanol or a lower-alkoxy-lower-alkanol. The same reaction medium is employed to advantage in the subsequent oxidation step so that it becomes unnecessary to isolate the dihydropyrazinoic acid formed as an intermediate product.

It is surprising that the condensation of the diaminopropionic acid with glyoxal should proceed smoothly because the analogous synthesis of pyrazine by condensation of ethylene diamine with glyoxal had been found to be very difficult and had not been achieved at the time this invention was made.

Diaminopropionic acid is obtained in good yields by converting acrylic acid to $\alpha,\beta$-dichloropropionic acid, and reacting the latter with ammonia.

The alkalinizing agent may be a strong inorganic base such as an alkali metal hydroxide, or a strong organic base, such as a quaternary lower-alkyl ammonium hydroxide. Air is an excellent oxidizing agent for converting dihydropyrazinoic acid to pyrazinoic acid, and is preferred because of its availability and its low cost, but pure oxygen and other mild oxidants may be employed.

Methanol and 2-methoxyethanol are representative of the group of solvents that must be employed in the reaction of this invention if yields economically competitive with the afore-described methods relying on oxidation of side chains on the pyrazine ring are to be achieved.

The invention thus provides a synthesis of pyrazinoic acid which involves a simple condensation reaction and an oxidation carried out in the same medium and employing an oxidizing agent which is not only available free of cost, but also does not produce side products requiring removal by costly procedures.

The reaction conditions are not overly critical and are readily maintained by means of simple equipment, and the reaction mixture ultimately produced is worked up to a pure product in a simple manner.

Description of a preferred embodiment

The following example is further illustrative of the present invention, and it will be understood that the invention is not limited thereto:

EXAMPLE 22.5 grams $\alpha,\beta$-diaminopropionic acid hydrochloride were dispersed in methanol. The dispersion was heated to 50° C., and 218 ml. of a 2.96-normal solution of sodium hydroxide in methanol (4 mole equivalents of the diamino-propionic acid) were gradually added with stirring. A clear solution was obtained. While stirring was continued, and the temperature was maintained at 50° C., 17.6 ml. of an aqueous 40% glyoxal solution were added slowly, and stirring was continued for ten minutes after addition was completed.

The solution now contained dihydropyrazinoic acid, and a vigorous stream of air was passed through the solution for about 30 to 45 minutes while it was being refluxed. It was next evaporated to dryness in a vacuum.

The residue was taken up in as little hot methanol as possible, and the mixture of solids and liquid was stirred until the solid material was reduced to a powdery consistency. The mixture was then cooled to 0° C. and left to stand overnight at this temperature. The precipitate was separated from the supernatant liquid by filtration, and was dried. It consisted of the sodium salt of pyrazinoic acid and of inorganic salts.

The crude product was dissolved in about 100 ml. water and the solution was tested by optical methods for its content of pyrazinoic acid. Enough 2 N hydrochloric acid (about 65 ml.) was added to adjust the pH to 2.0, whereby precipitation of free pyrazinoic acid was started. The acid was permitted fully to precipitate for 1 to 2 hours at 0° C., and was then filtered off, washed with a little water, and dried. A small second crop of pyrazinoic acid was obtained by evaporation of the acid filtrate, by dissolving the residue obtained in water, and by again precipitating with dilute hydrochloric acid.

The combined yield was 10.3 g. pyrazinoic acid having a purity of 99.4 percent. Based on the diaminopropionic acid hydrochloride originally employed, the yield was 52 percent. The yield may be increased to 60 percent by replacing the aqueous glyoxal solution with crystallized glyoxal under otherwise identical conditions.

The same results were obtained when methanol was replaced as a solvent by 2-methoxyethanol or 2-ethoxyethanol in which the continuous carbon chains have not more than two members.

The use of an excess of alkali over all acids present is essential for the success of the condensation reaction. Pyrazinoic acid is not formed in amounts detectable by the very sensitive UV-absorption method at 270 mμ if the condensation reaction is performed in a medium containing only enough alkalinizing agent to neutralize the carboxyl group of the diaminopropionic acid.

It is known that ketones react readily with ethylenediamine in the absence of free alkali to form dihydropyrazine derivatives which may then be oxidized to the corresponding pyrazine derivatives. This method is unsuccessful with glyoxal which was known heretofore to form only linear polymers with ethylene diamine, and has now been found to be equally inoperative for preparing pyrazinoic acid from diaminopropionic acid and glyoxal.

We prefer to react glyoxal and α,β-diaminopropionic acid in approximately equimolar amounts. A very pure product is obtained most economically if an approximate molar ratio of 1:1 of the reactants is used. An excess of the acid is not harmful, but it does not improve the yield nor the quality of the product, and the acid is relatively costly. When more than approximately 1.5 moles glyoxal are employed in the reaction mixture per mole of diaminopropionic acid, there is a significant decrease in the yield and in the purity of the pyrazinoic acid produced.

The reaction temperature may be chosen freely to suit the equipment available and the reaction medium employed. The time required for condensation of the glyoxal with the diaminopropionic acid increases as the temperature is decreased. In the absence of any advantage to be derived from cooling the reaction mixture, we prefer to operate at room temperature (about 15° to 25°) or at elevated temperatures which permit operation in open vessels and are therefore limited by the boiling temperature of the reaction medium. It is generally most economical to perform the condensation reaction at temperatures between 30° C. and 60° C., but the reaction also takes place at higher and lower temperatures.

The reaction medium need not be anhydrous if the highest possible yields are not required. At water contents higher than about 10 percent of the reaction mixture, there is a significant decrease in yield.

While air or other oxygen bearing gases have the obvious advantages outlined hereinabove, the invention is not limited to the use of oxygen as an oxidant. The same results are obtained when oxygen is replaced as a mild oxidant by hydrogen peroxide, mercuric chloride, and other oxidizing agents having similar oxidation potentials, and the temperature in the oxidation step will be chosen to suit the oxidant. A relatively high temperature is preferred for oxidation with air, but at the lower temperatures the same reaction takes place, though at a slower rate.

Sodium hydroxide may be replaced as the alkalinizing agent in the condensation reaction and during oxidation by corresponding amounts of other alkali metal hydroxides but sodium hydroxide is more economical than the hydroxides of lithium or potassium, and nothing is gained by the use of the more costly agents. Similar reasons normally exclude strong organic bases from consideration, but all quaternary lower-alkyl ammonium hydroxides are fully effective, and other strong organic bases may be employed without materially affecting the results achieved.

The amount of excess alkali (or its equivalent) in the condensation medium should be at least 1.3 equivalents per mol of diaminopropionic acid. The specifically disclosed excess of two mol equivalents has been found to be in the range of operating conditions which produce the highest yield, and extends from approximately 1.5 to 2.1 equivalents. A very large excess of alkali causes a reduction in yield, probably due to secondary reactions, but an excess up to 2.3 equivalents produces at least satisfactory results.

While the invention has been described with particular reference to specific embodiments, it is to be understood that it is not limited thereto, but is to be construed broadly and restricted solely by the scope of the appended claims.

We claim:
1. A method of preparing pyrazinoic acid which comprises:
  (a) condensing α,β-diaminopropionic acid with glyoxal in an alkaline liquid medium until dihydropyrazinoic acid is formed, said medium mainly consisting of an alcohol selected from the group consisting of methanol and alkoxyalkanol, the continuous carbon chains of said alkoxyalkanol having not more than two members, and containing an excess of available stray alkalinizing agent over that required for neutralizing said diaminopropionic acid; and
  (b) oxidizing the dihydropyrazinoic acid to pyrazinoic acid.
2. A method as set forth in claim 1, wherein said dihydropyrazinoic acid is oxidized in said medium by passing air through said medium.
3. A method as set forth in claim 1, wherein said medium contains an amount of water not substantially greater than ten percent.
4. A method of preparing a solution of dihydropyrazinoic acid which comprises condensing α,β-diaminopropionic acid in a medium containing an excess of alkali metal hydroxide with glyoxal until said dihydropropionic acid is formed, said medium mainly consisting of methanol or an alkoxyalkanol, the continuous carbon chains of said alkoxyalkanol having not more than two members.
5. Dihydropyrazinoic acid.
6. A method as set forth in claim 1, wherein said excess of said alkalinizing agent is between 1.3 and 2.3 equivalents of said agent per mol of said diaminopropionic acid.
7. A method as set forth in claim 6, wherein said alcohol is methanol or 2-methoxyethanol.

References Cited

Krems: Chemical Reviews, vol. 40 (1947), pp. 311–313 QD1A 563.

Badger, Chemistry of Heterocyclic Compounds (1961), pp. 414–415 and 417 QD 400 B25.

NICHOLAS S. RIZZO, *Primary Examiner.*